United States Patent [19]

Companiony

[11] Patent Number: 5,157,862

[45] Date of Patent: Oct. 27, 1992

[54] FISHING LEADER HOLDER

[76] Inventor: Dionisio Companiony, 10250 SW. 37th Ter., Miami, Fla. 33165

[21] Appl. No.: 755,538

[22] Filed: Sep. 5, 1991

[51] Int. Cl.⁵ ............................................ A01K 97/06
[52] U.S. Cl. ..................................................... 43/57.2
[58] Field of Search ................................. 43/57.1, 57.2

[56] References Cited

U.S. PATENT DOCUMENTS

| | | | |
|---|---|---|---|
| 502,427 | 8/1893 | Zangenberg | 43/57.2 |
| 595,998 | 12/1897 | Gailand | 43/57.2 |
| 657,786 | 9/1900 | Plumley | 43/57.2 |
| 674,984 | 5/1901 | Plumley | 43/57.2 |
| 1,490,370 | 4/1924 | Figley | 43/57.2 |
| 2,069,661 | 2/1937 | Tiede | 43/57.2 |
| 2,102,682 | 12/1937 | De Witt | 43/57.2 |
| 2,750,706 | 6/1956 | Seals | 43/57.2 |
| 2,866,295 | 12/1958 | Shanks | 43/57.2 |
| 2,920,415 | 1/1960 | Pfeiffer | 43/57.2 |
| 4,691,471 | 9/1987 | Hansen | 43/57.2 |

Primary Examiner—Kurt C. Rowan
Attorney, Agent, or Firm—Malloy, Downey & Malloy

[57] ABSTRACT

A fishing leader holder, to be used independently or in combination with a fishing tackle box, wherein the fishing tackle holder is fitted and removably attached to an inside surface of the cover portion of the tackle box. The fishing leader holder includes at least one back panel having looping means designed to hold the folded center of the fishing leader wire, and hooking means designed to securely and separately hold the hook ends and the swivel ends of a plurality of fishing leaders, thereby holding the plurality of fishing leaders in a secure, orderly, and untangled arrangement.

14 Claims, 3 Drawing Sheets

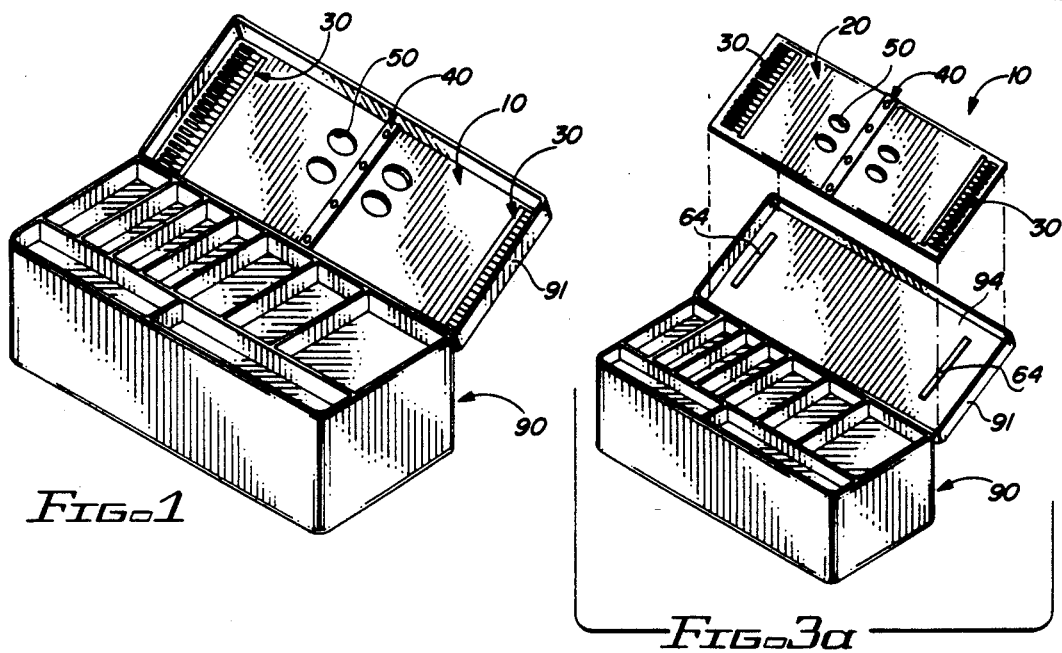
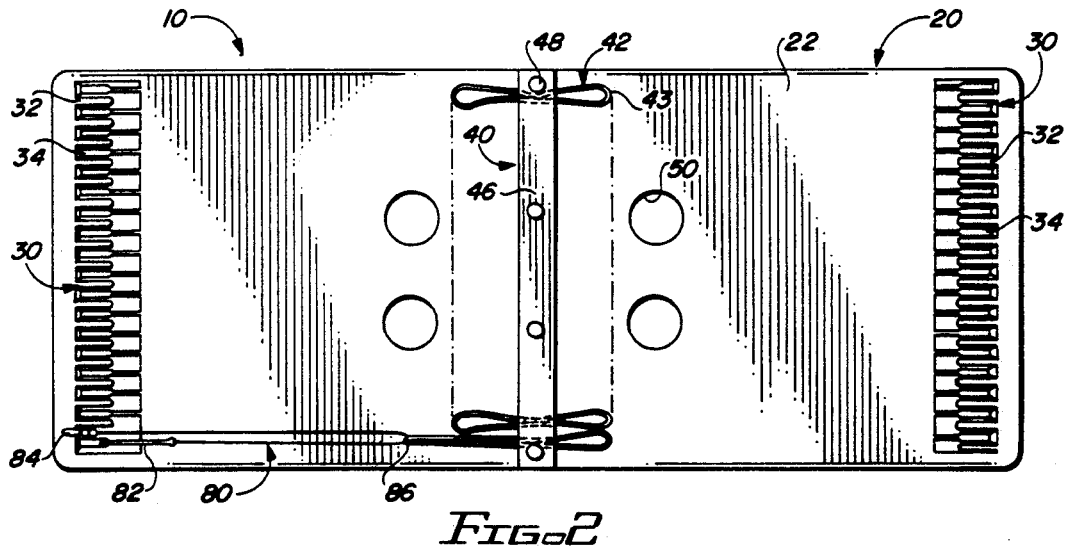
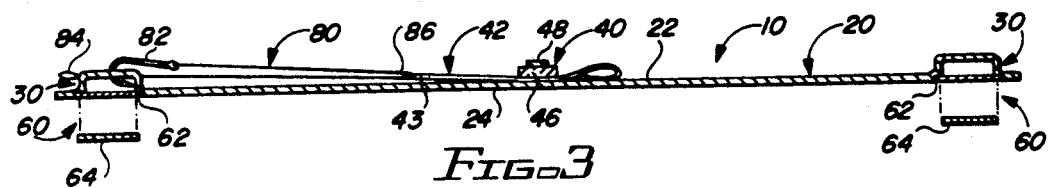

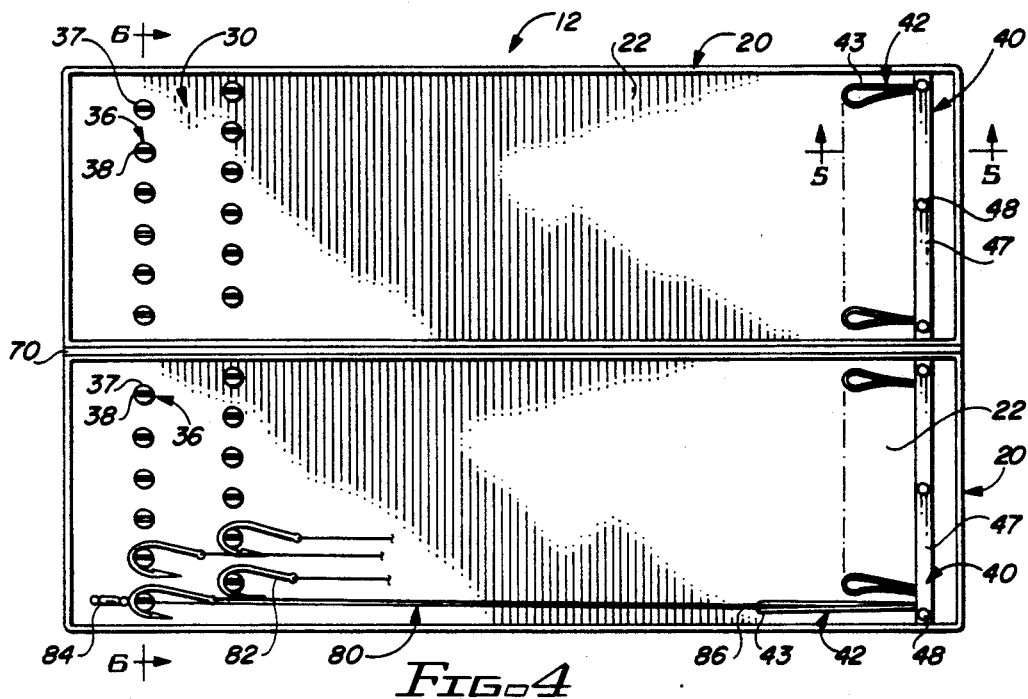
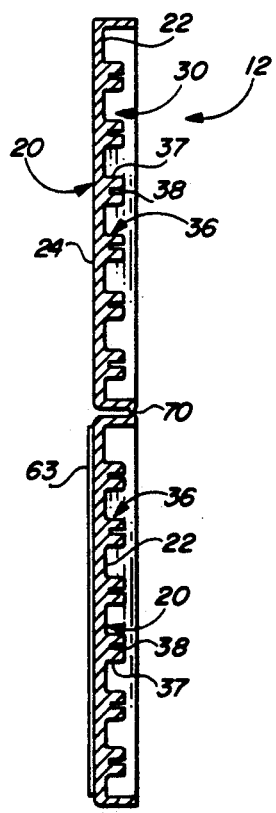
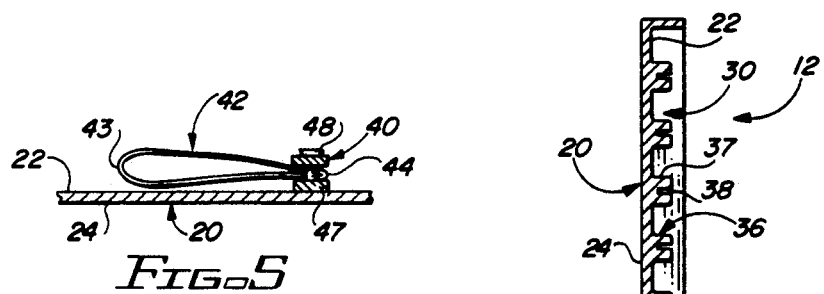
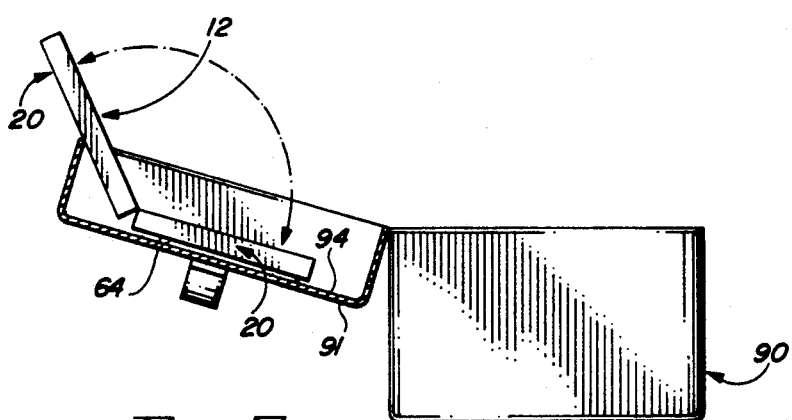

FISHING LEADER HOLDER

BACKGROUND OF THE INVENTION

1. Field of the Invention

This invention relates to a fishing leader holder adapted to be used independently or to be removably fastened to the inside cover of a tackle box, thereby providing the user with an orderly means of arranging and carrying a plurality of fishing leaders in a secure untangled manner.

2. Description of the Prior Art

Fishing leaders are a commonly used fishing tool. They consist of a relatively short length of wire or other suitable material attached at one end to a hook and at the opposite end to a swivel, which is designed to be attached to a clip on the end of the fishing line. Accordingly, a person may have numerous hooks and lures readily prepared for quick and easy attachment to the fishing line. The primary difficulty when using a fishing leader involves organizing them so that they can be easily and individually accessed. All too often, the fishing leaders become a tangled mess and cannot be organized. Even when an organizer of some sort is utilized to hold the fishing leaders, it is usually haphazardly placed within the tackle box such that it will bounce around and tangle with numerous other items found within the tackle box.

Accordingly, there is a need for a neat and orderly way to secure a plurality of fishing leaders such that they will be easily accessible, not be susceptible to getting tangled, and capable of being carried independently without the hooks being able to accidently hook something or someone. Applicant's invention is designed to provide precisely such an item. It provides a convenient removable holder which will hold a plurality of fishing leaders in an untangled, organized array.

SUMMARY OF THE INVENTION

The present invention is directed towards a fishing leader holder to be used independently or in conjunction with a tackle box. The fishing leader holder may be attached to the inner surface of the tackle box cover portion by adhesively attached magnets on the inside cover portion of the tackle box which are designed to magnetically attach with ferrous metal portions on the back panel of the fishing leader holder. The fishing leader holder includes primarily a back panel, looping means, and hooking means. The looping means which are attached on the front face of the back panel are designed to receive therethrough a fishing leader such that the folded center portion of the leader is securely held. Positioned on a distal end of the back panel, opposite the looping means is the hooking means which is designed to adaptively receive and secure the hook and swivel portion of the fishing leader, such that the fishing leader extends between the looping means and the hooking means. The fishing leader holder may include only one back panel, or a plurality of back panels hingedly attached so as to form a book type assembly which encloses the front face of the back panel.

BRIEF DESCRIPTION OF THE DRAWINGS

For a fuller understanding of the nature of the present invention, reference should be had to the following detailed description taken in connection with the accompanying drawings in which: FIG. 1 is a perspective view of a single panel fishing leader holder attached to the inside surface of a tackle box cover portion.

FIG. 2 is an overhead view of a single panel fishing leader holder.

FIG. 3 is a side view of a single panel fishing leader holder.

FIG. 3A is an exploded view of a single panel fishing leader holder and a tackle box.

FIG. 4 is an overhead view of a book-type fishing leader holder.

FIG. 5 is a cross-sectional view taken along line 5—5 of the embodiment of FIG. 4.

FIG. 6 is a cross-sectional view taken along line 6—6 of the embodiment of FIG. 4.

FIG. 7 is a side view of the book-type fishing leader holder secured to the cover portion of the tackle box.

Like reference numerals refer to like parts throughout the several views of the drawings.

DETAILED DESCRIPTION OF THE PREFERRED EMBODIMENT

Figure 8:
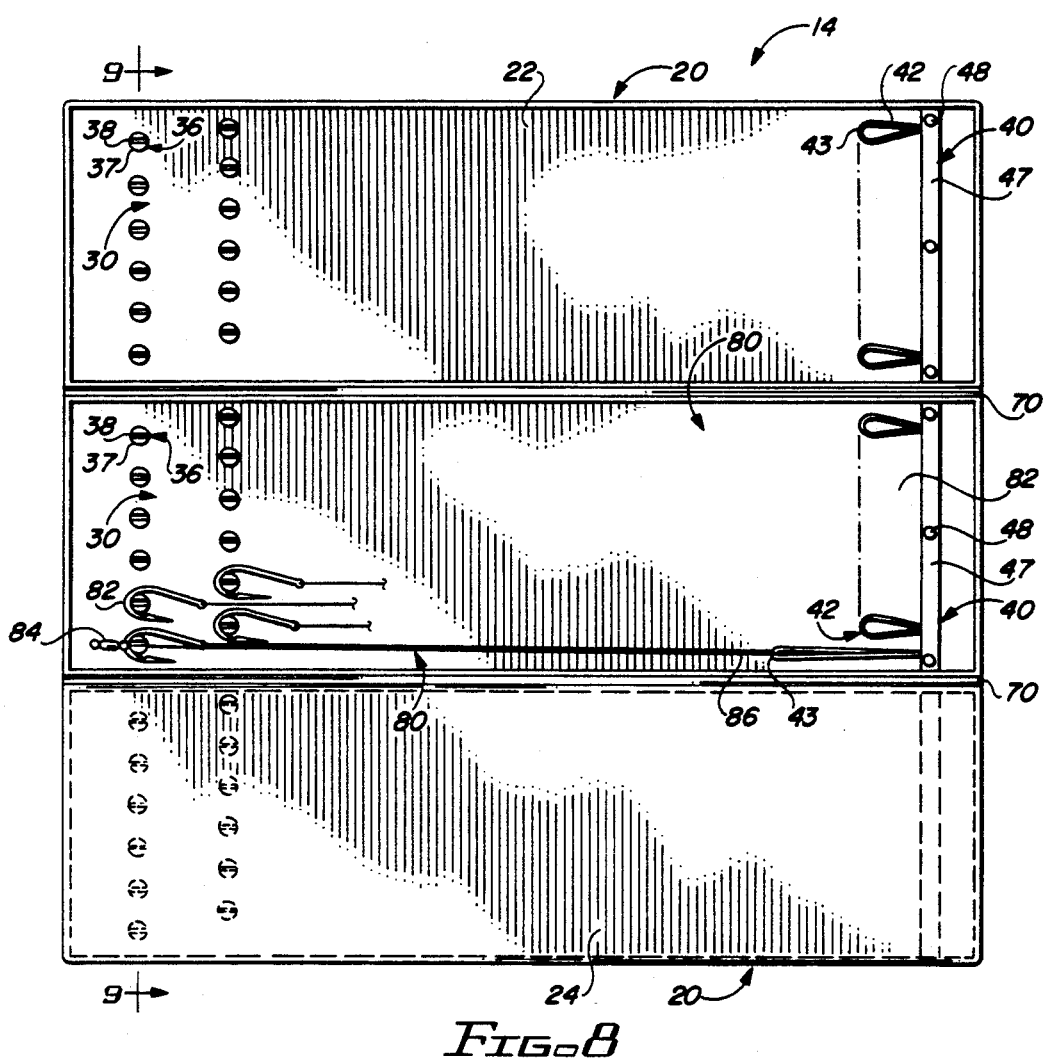
FIG. 8 is an overhead view of a double-sided book-type fishing leader holder.
Figure 9:
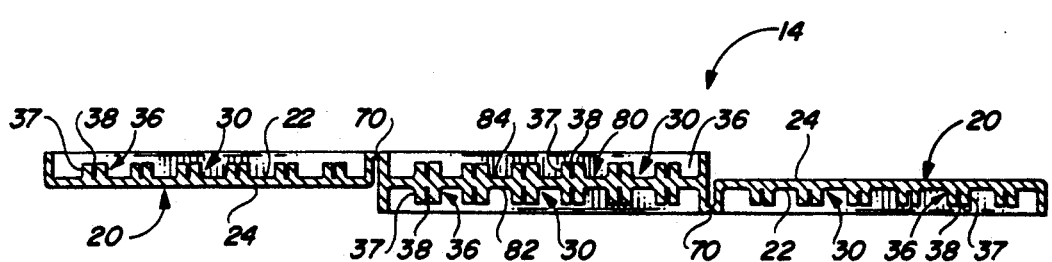
FIG. 9 is a cross-sectional view along line 9—9 of the embodiment of FIG. 8.

As shown throughout FIGS. 1-9, there are three preferred embodiments of the applicant's invention. The first of these is the single panel fishing leader holder, generally indicated as 10. As shown in FIG. 1, the single panel fishing leader holder consists primarily of a back panel 20 sized and configured to be positioned inside the cover portion 91 of a tackle box 90.

Turning to FIG. 2, the front face 22 of the back panel 20 includes hooking means, generally indicated as 30, attached along opposite ends of the front face and looping means generally indicated as 40 located across the center of the front face 22 of the back panel 20. The hooking means 30 includes a row of alternating slots 32 and grooves 34, which as best shown in FIG. 3, is a raised, molded part of the back panel 20. The slot 32 is designed to adaptively receive the hook end 82 of the fishing leader 80 therethrough, and the grooves 34 are designed to receive the swivel end 84 of the fishing leader 80 therethrough. Returning to FIG. 2, the looping means 40 includes a plurality of rubber bands 42 extending across the front surface 22 of the back panel 20. The rubber bands 42 are secured to the back panel 20 by a narrow rod 46 which extends across a mid-portion of the rubber bands 42, in secure relation against the front face 22, such that a hooking end 43 of the rubber band 42 extends from both sides. The narrow rod 46 is secured to the back panel 20 by a screw or like item 48, so as to prevent slippage or accidental removal of the rubber band 42 from between the rod 46 and the front face 22 of the back panel 20. As shown in FIG. 3, the looping end 43 of the rubber band 42 is designed to hold the folded center portion 86 of the fishing leader 80 therethrough such that the fishing leader 80 is held taught between the hooking means 30 and the looping means 40. Also located on the back panel 20 are a plurality of lifting holes 50 to facilitate removal of the single panel fishing leader holder from the tackle box 90. Attached to the rear surface 24 of the back panel 20, in covering relation under the hooking means 30, is a bonded metal guard 62, shown in FIG. 3, which is part of the fastening means 60. The fastening means 60 includes the bonded metal guard 62 and magnets 64 which are adhesively attached to the inside surface 94, as shown in FIG. 3A, of the tackle box 90 cover portion 91.

In a second embodiment, the book-type fishing leader holder 12, which is shown in FIG. 4, includes two back panels 20. Each of said back panels 20 has the hooking means 30 and the looping means 40 located at opposite distal ends of the front surface 22 of each back panel 20. The looping means 40, depicted in FIG. 5, includes a clip-type narrow rod 47 which separates the looping end 43 of the rubber band 42, from a knotted end 44 of the rubber band 42, and is secured to the back panel 20 by a screw or like item 48.

As shown in FIG. 6, the hooking means 30 includes a plurality of spaced protruding knobs, generally indicated as 36, having a sufficiently elongate surrounding side wall structure 37 so as to hold the hook end 82 of a fishing leader 80. Each of the knobs include a notch 38 extending across the diameter thereof which is designed to receive the swivel end 84 of the fishing leader 80. The back panels 20 are hingedly attached by a substantially thin layer of molded material 70, thereby allowing the back panels 30 to fold onto one another as shown in FIG. 7. The book-type fishing leader holder 12 may also include a ferrous metal plate 63 attached to the rear surface 24 of one of the back panels 20 which is designed to be magnetically attached to a magnet 64 on the inside surface 94 of the cover portion 91 of a fishing tackle box 90.

The book-type fishing leader holder of the present invention may further include a double-sided book-type fishing leader holder 14, shown in FIG. 8. The double-sided book-type fishing leader holder 14 includes a double-sided panel 80 having hooking means 30 and looping means 40 at opposite ends of a front face 82 and a rear face 84. This double-sided middle panel 80 is attached to back panels 20, 20' on both sides such that one back panel 20 closes on to the front face 82 of the double-sided middle panel 80, and a second back panel 20' closes onto the rear side 84 of the double-sided middle panel 80.

Now that the invention has been described, what is claimed is:

1. For use individually or in combination with a fishing tackle box of the type having an opening upper lid defining a cover portion, a fishing leader holder comprising:
    at least one back panel,
    said back panel including a front face and a rear face,
    said front face including hooking means for securing a hook and a swivel on opposite distal ends of a fishing leader,
    said front face further including looping means through which an individual leader may pass, such that a folded center portion of said leader may be held therein,
    said looping means including a plurality of rubber bands secured to a mid-portion of said back by a narrow rod extending transversely across a width of said back panel and being secured to said back panel by securing means, and
    said hooking means and said looping means being disposed in spaced apart relation along a length of said back panel, such that the fishing leader may be secured thereto in substantially taught relation extending therebetween.

2. A fishing leader holder as recited in claim 1 wherein said hooking means is disposed along at least one end of said panel, and includes a plurality of grooves for holding the distal end of the leader having the swivel thereon.

3. A fishing leader holder as recited in claim 1 wherein said back panel includes at least one ferrous metal plate on said rear face of said back panel, which is positioned so as to magnetically attach said back panel to at least one correspondingly positioned magnet adhesively attached to an inside surface of the cover portion of the tackle box.

4. A fishing leader holder for arranging a plurality of fishing leaders in a preferred orientation, comprising:
    a back panel sized and disposed to be fitted on an inside surface of a tackle box cover portion,
    said back panel including integrally molded hooking means at opposite ends thereof,
    said hooking means including a row of raised, alternating slots and grooves,
    said back panel further including looping means, said looping means including a plurality of rubber bands extending transversely across a width of said back panel and disposed between both of said hooking means, being structured to hold a folded mid-section of the leader wire therethrough,
    said looping means further including a narrow rod overlying a mid-section of said rubber band so as to allow a looped end of each of said rubber bands or like items to protrude from opposite sides of said narrow rod,
    said narrow rod being secured to said back by a screw or like securing item, such that said rubber bands or like item will be secured in a substantially non-slidable position therebetween,
    removal means for removing said back panel from the inside surface of the tackle box cover portion, and
    fastening means for attaching said back panel to the inside surface of the tackle box cover portion.

5. A fishing leader holder as recited in claim 4 wherein said slots are designed to receive a distal end of the leader having a hook thereon.

6. A fishing leader holder as recited in claim 5 wherein said grooves are designed to receive the leader adjacent a swivel end of the leader, after the swivel end has been passed through said looped end of said rubber band, said swivel end being substantially larger in dimension than a width of said grooves, preventing passage therethrough in response to a biasing force exerting by said looping means.

7. A fishing leader holder as recited in claim 4 wherein said removal means includes a plurality of finger holes in said back panel, disposed on opposite sides of said looping means.

8. A fishing leader holder as recited in claim 4 wherein said back panel includes a bonded metal guard covering a rear of said hooking means in said back panel.

9. A fishing leader holder as recited in claim 8 wherein said fastening means includes at least one magnet adhesively attached to the inside surface of the tackle box cover portion, such that said bonded metal guards will magnetically attach to said magnets, thereby fastening said back panel to said tackle box cover portion.

10. A fishing leader holder comprising:
    at least two integrally molded back panels,
    each of said back panels including a front face and a rear face,
    each of said front faces including hooking means along an end thereof, each of said front faces further including looping means along an opposite end thereof, opposite said hooking means, said looping means including a plurality of rubber bands, each being knotted at one end, and a narrow rod, attached to said back panels by screws, clipping said knotted end of said rubber band such that tension on a looped end of said rubber band will not cause said knotted end to pass under said narrow rod, said hooking means structured and disposed to hold a hook end and a swivel end of a fishing leader, with a folded mid-section of the fishing leader being held by said looping means, and hinge means long a length of said back panel, attaching said back panels along correspondingly positioned sides so as to allow said back panels to be movable between an open position and a closed position, said closed position being defined by said panel disposed in overlying, stacked relation to one another.

11. A fishing leader holder as recited in claim 10 wherein said hooking means includes a plurality of protruding knobs having a sufficiently elongate side wall structure to hold the hook of a fishing leader in a secure hooked manner thereabout, and having a notch extending across its diameter to receive the leader adjacent the swivel end thereof.

12. A fishing leader holder as recited in claim 10 wherein said back panels are attached by said hinge means to a thicker, integrally molded middle panel having hooking means and looping means on both a front face and an opposite rear face, such that each of said back panels hingedly move to close on said opposite faces of said middle panel.

13. A fishing leader holder as recited in claim 10 wherein said hinge means includes a substantially thin layer of integrally molded material which is structured and disposed to be bendable, thereby allowing said panels to fold into overlying relation with one another, thereby forming said book-type case.

14. A fishing leader holder as recited in claim 1 wherein one of said back panels may have a ferrous metal plate attached to said rear face, so as to enable said back panel to be fastened to an adhesively attached magnet on the inside surface of the tackle box cover portion.

* * * * *